United States Patent Office 3,215,687
Patented Nov. 2, 1965

3,215,687
PROCESS FOR PREPARING SODIUM SALTS OF RIBONUCLEOTIDES
Yoshio Tsuchiya, Yokohama, Izumi Hayashi, Kawasaki, Tetsuya Kato, Tokyo, Masaharu Yoshikawa, Kawasaki, Hisao Mori, Tokyo, and Shiyu Miyasaka, Kawasaki, Japan, assignors to Ajinomoto Co., Inc., Tokyo, Japan
No Drawing. Filed Jan. 22, 1964, Ser. No. 339,363
Claims priority, application Japan, Dec. 28, 1959, 34/40,844
9 Claims. (Cl. 260—211.5)

This is a continuation-in-part application of our copending application Serial No. 69,268, filed November 15, 1960, now abandoned.

The present invention relates to a process for preparing sodium salts of ribonucleotides and more particularly to a process for obtaining crystalline sodium salts of 5'-nucleotides, such as sodium 5'-inosinate or 5'-guanylate, which are useful flavoring agents.

It is the main object of the present invention to provide a simple, economical process for recovering sodium nucleotides of high purity at high yield from aqueous solutions containing small quantities of the ribonucleotides and large quantities of colored materials together with other organic and inorganic materials. A more specific object is the recovery of nucleotides without the use of toxic agents.

It has been known that inosinic acid, which is a ribonucleotide, is present in aqueous extracts of muscle tissue from animals such as fresh fish, fowl, cattle, "Niboshi" (dried sardines and the like), "Katsuobushi" (dried bonito), and gives such tissues their specific taste. Ribonucleotides, such as 5'-inosinic acid, 5'-guanylic acid, 5'-adenylic acid may also be obtained in the form of their aqueous solutions by enzymatic hydrolysis of the corresponding ribonucleic acids, as disclosed in U.S. Patent No. 3,104,171. However, these extracts or solutions obtained from natural materials usually contain appreciable amounts of colored materials of high molecular weight together with water-soluble proteins, carbohydrates, amino acids (e.g. histidine, glycine, and glutamic acid), other organic acids (e.g. succinic acid and lactic acid), organic bases (e.g. hypoxanthine), and/or inorganic acids and salts (e.g. hydrochloric acid and phosphoric acid and their sodium and calcium salts). It was considered rather difficult heretofore to separate pure inosinic acid or guanylic acid from said water extracts or solutions.

The best conventional processes require the use of toxic or expensive reagents, and cannot readily be adapted to industrial production of the sodium salts of ribonucleotides as flavoring agents.

We have found that nucleotides such as inosinic acid or guanylic acid are selectively adsorbed by decolorizing resins from the aforementioned aqueous solutions, and can be selectively eluted from said resins.

The term "decolorizing resins" as employed in this specification and the appended claims refers to neutral resinous materials, having a molecule with one or more polar hydroxyl or amino radical substituents but lacking substantial ion-exchange activity. The term "decolorizing resins" is commonly used in this sense. (See "Ion Exchange Technology" edited by F. C. Nachod and J. Schubert, Academic Press Inc., New York, 1956.)

The decolorizing resins are gels having a large effective surface area and containing weak basic and/or acidic groups. They are correspondingly regenerated by acid and alkali solutions.

Decolorizing resins suitable for this invention can be obtained by condensing formaldehyde with phenol, resorcinol, and/or m-phenylene diamine by the method disclosed in the Belgian Patent No. 449,058 (1943). They are commercially available, for example, as "Centranol W–291" (N.V. Chemurgische Produkten, Amsterdam, Holland), "Duolite S–30" (Chemical Process Co., Bedwood City, Calif., U.S.A.), "Wofatit E" (VEB Farbenfabrik Wolfen, Bitterfeld, Germany) and "Asmit 173,-224" (Industrieele Maatschappij Activit N.V., Amsterdam, Holland). These resins are commonly used in the decolorization of raw sugar solutions or raw protein hydrolyzates. Their action is believed mainly to be due to the molecular adsorption of coloring matter in their porous gel structure. The decolorizing resins do not retain inorganic salts or ions because of the absence of significant ion-exchange activity.

We have found that ribonucleotides such as inosinic acid and guanylic acid which have comparatively large molecules of complex chemical structure are easily adsorbed by decolorizing resins while the substances which accompany the nucleotides in solutions derived from natural sources such as carbohydrates, amino acids, other organic acids, organic bases, inorganic acids, and inorganic salts which have comparatively small molecules of relatively simple chemical structure are not adsorbed in significant amounts. Accordingly, ribonucleotides can be separated from carbohydrates, amino acids, other ionizing organic acids, ionizing organic bases, inorganic acids, and inorganic salts by selective adsorption. However, complex substances constituting coloring matter in these solutions are adsorbed on the decolorizing resin together with the nucleotides. It appears that said coloring matters are formed by degradation of proteins, degradation and subsequent condensation of carbohydrates, and the reaction of amino acid with carbohydrate or their degradation products (so called browning reaction) and that the molecules of said coloring matters are larger and more complex than those of ribonucleotides.

We have found that the affinity of the accompanying coloring matter for the decolorizing resin is stronger than that of the nucleotides, and the present invention is mainly based upon this finding.

In accordance with the present invention, a raw aqueous solution obtained by extraction of animal tissue or from similar sources containing nucleotides, coloring matter, and such impurities as carbohydrates, amino acids, other ionizing organic acids, ionizing organic bases, inorganic acids, inorganic salts and the like, is adjusted to pH 2–7, and passed over a column of decolorizing resin. The coloring matter and nucleotides are selectively adsorbed by the resin while most of the carbohydrates, amino acids, other organic acids, organic bases, inorganic acids, inorganic salts and like substances of relatively low molecular weight pass through the resin. The portion of the resin on which the nucleotides are mainly adsorbed is eluted with 0.1–0.3 N aqueous sodium hydroxide, the eluate is neutralized to pH 7, concentrated to 0.1–0.3 mole/l., and the sodium nucleotides are crystallized that pH 7–8.

We have investigated the influence of pH on the adsorption of ribonucleotides by the resins, and we have found that the nucleotides are not adsorbed at a pH value of about 10, that adsorption gradually increases with decrease of pH, and that maximum adsorption occurs at approximately pH 2–3, the amount adsorbed in this pH range being more than twice the amount adsorbed at pH 7. We also found that the anionic and cationic groups of the various decolorizing resins have no effect on the pH range of maximum adsorption and that maximum adsorption occurs at the pH value at which the electric charge of a nucleotide is zero.

Table 1 shows the influence of pH on the adsorption of inosinic acid by equal dry weights of various resins obtained from commercial sources, or conventionally prepared in the laboratory as more fully described hereinafter in Example 1. The resins are identified in the table by Roman numerals as follows:

I, condensate of formaldehyde with m-phenylenediamine
II, condensate of formaldehyde with resorcinol
III, condensate of formaldehyde with m-phenylenediamine and resorcinol
IV, condensate of formaldehyde with pyrogallol and resorcinol
V, Duolite S–30
VI, Centranol W–291

TABLE 1

| pH | Inosinic Acid Adsorbed Per Gram Dry Resin, mg. | | | | | | | |
|---|---|---|---|---|---|---|---|---|
| | 1 | 2 | 3 | 4 | 5 | 6 | 7 | 8 |
| Decolorizing Resin: | | | | | | | | |
| I | 132 | 151 | 130 | 108 | 80 | 52 | 35 | 13 |
| II | 126 | 152 | 130 | 110 | 88 | 60 | 31 | 14 |
| III | 128 | 154 | 152 | 130 | 112 | 95 | 66 | 42 |
| IV | 120 | 130 | 110 | 110 | 91 | 62 | 34 | |
| V | 130 | 143 | 132 | 104 | 86 | 50 | 29 | |

It is evident from Table 1 that the differences in hydrogen ion concentration between the aqueous inosinic acid solutions contacted with the several resins by far outweigh the differences in chemical composition between the several decolorizing resins employed.

Table 2 shows the similar influence of pH on different nucleotides in comparison with a representative nucleoside. Duolite S–30 was employed in all experiments summarized in Table 2.

TABLE 2

| pH | Amount of Compound Adsorbed Per Gram Duolite S-30 | | | | | | | | |
|---|---|---|---|---|---|---|---|---|---|
| | 1 | 2 | 3 | 4 | 5 | 6 | 7 | 8 | 9 |
| Compound: | | | | | | | | | |
| Inosinic acid | 120 | 130 | 110 | 110 | 91 | 62 | 34 | | |
| Guanylic acid | 86 | 109 | 99 | 73 | 66 | 52 | 30 | 25 | 16 |
| Cytosine | 24 | 36 | 33 | 50 | 61 | 64 | | 58 | |

Other ribonucleotides, such as adenylic acid, cytidylic acid and uridylic acid, are affected in their adsorption behavior with respect to decolorizing resins in the same manner as 5′-inosinic acid and 5′-guanylic acid, and are recovered from their mixtures with impurities including organic coloring matter of high molecular weight in the same manner as more specifically described with respect to inosinic and guanylic acids.

As shown in Tables 1 and 2 the amount of nucleotides adsorbed on a unit volume of decolorizing resin at a pH of 2–3 is much greater than that of a nucleoside (cytosine) adsorbed at its optimum pH value. We have also investigated the influence of pH on the adsorption of typical coloring matter. The results obtained are shown in Table 3.

Table 3 shows the optical density to light of 450 millimicrons of the effluent from a column containing 10 milliliters Duolite S–30 when varying amounts of a "Niboshi" (dried sardines) extract were adjusted to pH values varying between 3 and 10 and were passed through the column. The color intensities were measured at various dilutions to bring them within the range of greatest accuracy of the spectrophotometer employed. The original extract, when diluted 1:10, had a color intensity of 0.420.

TABLE 3

| pH | 3 | 4 | 6 | 8 | 9 | 10 |
|---|---|---|---|---|---|---|
| Volume of effluent, ml | 200 | 200 | 200 | 100 | 20 | 20 |
| Color intensity | 0.036 | 0.060 | 0.075 | 0.150 | 0.380 | 0.425 |
| Dilution | 1:1 | 1:1 | 1:1 | 1:1 | 1:10 | 1:10 |

Although Tables 1 to 3 indicate favorable selective adsorption of nucleotides at pH 2–3, we prefer to adjust the raw solution to pH 3–4 in order to improve the stability of the nucleotides. We have found that the loss of inosinic and guanylic acids and of other nucleotides by hydrolysis in aqueous solution at pH 3–4 is negligible even after more than ten hours at room temperature (18–25° C.).

Proteins may be removed from the raw material by a proteolytic enzyme in the usual manner prior to resin treatment. We prefer, however, to remove protein by adding a strong acid such as hydrochloric acid to the raw solution until the pH drops below 5, and protein coagulates and precipitates. The filtrate obtained after deproteination may be directly passed over the decolorizing resin without further pH adjustment.

The process according to this invention has three basic features. The first is the use of decolorizing resins lacking significant ion-exchange activity. The second is the adjustment of the raw solution to pH 2–7, and preferably to pH 3–4 prior to passage over the resin. The third is partition of the coloring matter and of the nucleotides during adsorption and their separate elution.

It was to be expected that the affinity between the coloring matter and a decolorizing resin would be great, but we have found that this affinity is stronger than that between nucleotides and the resin. When 0.1–0.3 N aqueous caustic soda is passed over a resin on which nucleotides and coloring matter are jointly adsorbed, the former is eluted almost completely, and most of the latter is left behind.

The two substances may therefore be separated to a certain extent by such treatment alone. However, it is far more effective and convenient to adsorb the nucleotides and the coloring matter on two separate parts of a resin column, and to elute the two parts separately.

The following example will illustrate the partition adsorption of nucleotides and coloring matter and their separation from amino acids and inorganic ions.

*Example 1*

Four tubular columns were each filled with 20 ml. of freshly activated "Duolite S–30," a decolorizing resin, and washed with water until the washings showed a pH of about 2. The resin columns were arranged in series flow. A solution of sodium inosinate 1 g., $NaH_2PO_4$ 30 g., soy sauce 20 g. in an adequate amount of water was adjusted to pH 3 with 6 N NHl and diluted to one liter. The solution was fed under a constant head to the first column, and the effluent rate was held at approximate 20 ml. per hour by a pinch clamp mounted on the discharge tube. The run was terminated after 700 ml. of the solution had passed through the four columns which were then washed with 300 ml. distilled water. The columns were disconnected and each was eluted with 100 ml. 0.2 N aqueous sodium hydroxide solution. The eluates were analyzed for inosinic acid, amino acid, inorganic phosphate, and color density. The results are shown in Table 4.

TABLE 4

|  | Na inosinate (g.) | NaH₂PO₄ (g.) | Amino acid nitrogen,[1] mg./l. | Color (optical density; −log T) at pH 6 and (dilution)[2] |
|---|---|---|---|---|
| Original Solution, 700 ml | 0.7 | 21 | 0.14 | 0.270 (1:10) |
| Combined effluent and washing, 1000 ml | 0 | 20 | 0.13 | 0.011 (1:1) |
| Eluate from 1st column, 100 ml | Trace | Trace |  | 0.282 (1:100) |
| Eluate from 2nd column, 100 ml | 0.63 |  |  | 0.018 (1:1) |
| Eluate from 3rd column, 100 ml | 0.04 | 0.04 |  | 0.006 (1:1) |
| Eluate from 4th column, 100 ml | 0.01 |  |  | 0.005 (1:1) |

[1] Total amino acid nitrogen as determined by Van Slyke's method.
[2] The color densities were determined on a spectrophotometer as 450 mμ. The samples were diluted with pH 6 phosphate buffer.

When the present invention is practiced on an industrial scale, two or more columns of decolorizing resin are arranged in series flow. The flow rate is controlled in such a manner that the first column or the first two columns mainly adsorb the coloring matter while the next column selectively adsorbs the ribonucleotides. An additional resin column is preferably arranged after the main nucleotide adsorbing column to adsorb residual ribonucleotides. The last column is normally not eluted, and is used as the main adsorbent column for the next batch. Ribonucleotides adsorbed by the resin of the main adsorbent column are eluted almost completely with 0.1–0.3 N aqueous caustic soda.

The excess alkali in the eluate from the main adsorbent column may be neutralized with a mineral acid such as hydrochloric acid. However, we prefer to pass the alkaline eluate over a weakly acidic cation-exchange resin in the H-form such as Amberlite IRC–50 (Rohm and Haas) or Duolite CS–100 or 101 (Chemical Process Co.). There is obtained an aqueous effluent solution which is lightly colored and which may contain as much as 5 g. sodium salts of ribonucleotides per liter together with traces of impurities. When the solution is concentrated and cooled, the salts readily crystallize. If 1.5–2.0 volumes of methyl or ethyl alcohol are added to the concentrate, the crystallization is almost complete.

The quantities of resin to be used in the decolorizing column and the main adsorbent column respectively depend upon the actual amounts of ribonucleotides and of coloring matter in the raw solution. The amount of coloring matter adsorbed in the main adsorbent column and that of ribonucleotides adsorbed in the decolorizing column can be minimized by using appropriate quantities of resin in each column. The recovery of ribonucleotides from the decolorizing column is not worthwhile when the amounts of resin in the columns are matched to the solution processed and to the flow rate.

The yield of sodium salts of ribonucleotides obtained according to the present invention is high when compared with the heretofore known processes as will be shown hereinafter. Moreover, the process according to this invention is carried out more simply and more easily than the known processes for isolating inosinic acid and other ribonucleotides.

The resin of the decolorizing column or columns is regenerated by elution of the coloring matter with approximately 0.5 N aqueous caustic soda in an amount about equal to the resin volume. The resin thereafter is thoroughly washed with water. Hydrochloric acid solution of the same concentration as the alkali and in the same amount is next passed over the resin, which is finally washed with water until the pH of the washings is about 2. The resin can be used about 100 to 150 times.

The following examples further illustrate the invention but are not to be construed as limiting the same.

*Example 2*

200 kg. "Niboshi" (dried sardines) were repeatedly extracted with hot water, and 1500 liters of a reddish-brown, opaque solution were obtained. After cooling, 8.6 liters 6 N hydrochloric acid were added to adjust the pH of the solution to 3. Coagulated protein was filtered off, and 1508 liters of a clear filtrate were obtained. The solution was found to contain 810 grams inosinic acid. The analysis was performed according to a method based on R. Bergkvist. A sample of the solution was subjected to elution chromatography with a strongly basic anion-exchange resin, Dowex-1 in the formic acid form, and the optical density of the inosinic acid fraction at 250 millimicrons was determined. All analytical values shown in this example were determined by this method.

A decolorizing resin was prepared by reacting a mixture of three parts m-phenylene diamine and two parts resorcin with two equivalents of formaldehyde in a conventional manner. The resinous condensation product was crushed and ground 10–50 mesh, and three resin columns were respectively charged with 20 liters, 80 liters, and 80 liters of the ground resin. The resin was activated by the afore-described regeneration method, and washed with water until the washings showed a pH of approximately 2.

The resin columns were connected in series in the above order. The clear deproteinized filtrate of the Niboshi extract was passed over the resin columns at a rate of 100 liters per hour. The resin columns were then washed with water at the same flow rate for two hours. Then water was passed through the first, second, and third column respectively at the rates of 40 liters, 160 liters and 160 liters per hour for 2 hours.

The second resin column was eluted with 0.2 N. aqueous caustic soda at the rate of 80 liters per hour. The eluate was introduced into a column charged with 40 liters of Amberlite IRC–50 (H-form) in order to remove the excess alkali. The neutralized eluate was periodically tested for inosinic acid. The fractions containing the latter were collected and amounted to 288 liters. The inosinic acid contained in the combined fractions was found to be 671 g.

The concentration of inosinic acid in the solution was thus increased 5-fold over that of the original Niboshi extract, whereas its color intensity was found to have decreased to one-fifth. Amino acids, other organic acids, and like impurities could not be found in the concentrate by means of paper chromatography.

The solution was concentrated at reduced pressure to 5 liters. Upon addition of 7.5 liters ethyl alcohol, light yellow crystals formed. The dried crystals weighed 985 g. Analysis showed that they contained 899 g. pure sodium inosinate having an optical density of at 250 mμ and a purity of 98% (according to nitrogen analysis) were obtained in a yield of more than 90%.

The first resin column was eluted with 0.2 N aqueous caustic soda at the rate of 20 liters per hour. The eluate was passed through a column charged with Duolite C-25, a polystyrene sulfonic acid type cation exchange resin in the H-form and 82 liters of a solution containing 98 g. inosinic acid were obtained. After neutralization with caustic soda, the solution was concentrated at reduced pressure to 0.8 liter, and 1.2 liters ethyl alcohol were added. 162 grams crude sodium inosinate crystals were precipitated. Analysis disclosed that they contained 145 g. pure sodium inosinate hydrate (7.5 $H_2O$) corresponding to 96 g. anhydrous sodium inosinate. Sodium inosinate crystals of more than 98% purity were obtained by recrystallization.

Although the elution of the third resin column was not necessary, it was carried out, and the eluate was found to contain only 21 g. of inosinic acid.

Sodium carbonate may be substituted for sodium hydroxide in equivalent amounts for selective elution of inosinic acid and the other ribonucleotides with which this invention is concerned.

Example 3

5000 milliliters of a slightly colored aqueous reaction mixture, prepared as described by Tsuchiya et al. (U.S. pat. appln. 254,588, now abandoned and replaced by copending application Serial No. 347,115, filed February 25, 1964), containing 26.2 grams sodium inosinate, 48.6 grams phosphoric acid, and 54 grams hydrochloric acid were diluted to 5.5 liters with water, and adjusted to pH 3 with alkali. The adjusted solution was passed through a column containing 1.5 liters of the decolorizing resin described in Example 2. The ionized inorganic acids passed unchanged through the column, and the inosinic acid was adsorbed on the resin. After washing with water, 0.5 N aqueous sodium hydroxide solution was passed through the column in order to elute the inosinic acid adsorbed. The eluate was concentrated to 200 milliliters in vacuo, and the concentrated solution was mixed with 300 ml. ethyl alcohol. Sodium inosinate crystallized, and the crystals were separated from the mother liquor. They weighed 23.3 grams. The yield of sodium inosinate was 88%.

Example 4

500 milliliters of the acidified inosinate solution of Example 3 were diluted to 3.5 liters with water, and adjusted to pH 2.5 with alkali. The adjusted solution was passed through a column containing 2 liters "Duolite S-30." After washing with water, 0.5 N aqueous sodium hydroxide solution was passed through the column. The eluate was concentrated, and alcohol was added. The crystals of sodium inosinate obtained weighed 21.8 grams, and the yield was 83.5%.

Example 5

One liter of a slightly colored aqueous solution, containing 3.4 grams sodium guanylate, 11 grams disodium hydrogen phosphate, and 30.5 grams sodium chloride was adjusted to pH 4 with hydrochloric acid. The solution was passed through a column containing 500 ml. "Centranol W-291." After washing, sodium guanylate was eluted with 0.5 N aqueous sodium hydroxide solution until the eluate became colored. The colorless fraction containing the sodium guanylate was concentrated to 50 ml., and the concentrated solution was mixed with 100 ml. ethanol. The mixture was stored in an ice-box over night, and sodium guanylate crystallized. The crystals separated from the mother liquor weighed 2.8 grams, and the yield was 82.5%.

Example 6

Three liters of a slightly colored cell-free fermentation broth were obtained by the process of the commonly assigned U.S. Patent application Serial Number 192,985 filed on May 7, 1962. The broth contained 300 milligrams guanylic acid, residual sugar, inorganic salts, and organic nutrients. It was adjusted to pH 3.5 with dilute hydrochloric acid. The acidified solution was successively passed through three columns, each containing 10 ml. of a decolorizing resin prepared from metaphenylenediamin, resorcin, and formaldehyde in the manner described in Example 2. The columns were connected in series. After washing, the columns were eluated with 0.5 N aqueous sodium hydroxide solution. The eluate was concentrated and mixed with methanol. Crystals of sodium guanylate thereupon separated from the mother liquor. They weighed 180 milligrams.

While the invention has been described with particular reference to specific embodiments, it is to be understood that it is not limited thereto but is to be construed broadly, and restricted solely by the scope of the appended claims.

What we claim is:

1. A process for preparing the sodium salt of a ribonucleotide from an aqueous solution containing said ribonucleotide together with organic coloring matter of high molecular weight, which comprises:
   (a) adjusting the pH value of said aqueous solution to the range between 2 and 7;
   (b) passing the adjusted solution over a decolorizing resin and adsorbing said ribonucleotide and said coloring matter on said resin;
   (c) passing an approximately 0.1 to 0.3 normal aqueous solution of an alkaline compound selected from the group consisting of sodium hydroxide and sodium carbonate over said resin until the adsorbed ribonucleotide is substantially eluted from said resin, while at least a major portion of said coloring matter is retained on said resin; and
   (d) recovering the sodium salt of said ribonucleotide from the eluate.

2. A process as set forth in claim 1, wherein said ribonucleotide is 5'-inosinic acid.

3. A process as set forth in claim 1, wherein said ribonucleotide is 5'-guanylic acid.

4. A process as set forth in claim 1, wherein said aqueous solution further contains at least one member selected from the group consisting of carbohydrates, amino acids, ionizing organic bases, ionizing inorganic acids, and ionizing inorganic salts.

5. A process as set forth in claim 1, wherein said decolorizing resin is a condensation product of formaldehyde with at least one member selected from the group consisting of phenol, resorcinol, and m-phenylene diamine.

6. A process as set forth in claim 1, wherein said ribonucleotide and said coloring matter are separately adsorbed on spaced portions of said decolorizing resin when the adjusted solution is passed over said resin, and said solution of an alkaline compound is selectively passed over the portion of said resin having said ribonucleotide adsorbed thereon.

7. A process as set forth in claim 1, wherein said pH value is adjusted to a range between 2 and 4 prior to the passing of said solution over said decolorizing resin.

8. A process as set forth in claim 1, wherein said coloring matter is selected from the group consisting of protein degradation products, carbohydrate degradation products, condensed carbohydrate degradation products, the products of reaction between an amino acid and a carbohydrate degradation product.

9. A process of preparing the sodium salt of a ribonucleotide selected from the group consisting of inosinic acid, guanylic acid, adenylic acid, cytidylic acid, and uridylic acid, from an aqueous solution containing said ribonucleotide together with organic coloring matter of high molecular weight, which comprises:
   (a) adjusting the pH value of said aqueous solution to the range between 2 and 7;
   (b) passing the adjusted solution sequentially over a plurality of bodies of decolorizing resin at such a rate that said coloring matter is mainly adsorbed on a first one of said bodies, and said ribonucleotide is mainly adsorbed on a second body of decolorizing resin spaced from said first body;

(c) eluting said second body of decolorizing resin with an approximately 0.1 to 0.3 normal solution of an alkaline compound selected from the group consisting of sodium hydroxide and sodium carbonate, whereby said ribonucleotide is preferentially removed from said second body with eluate; and (d) recovering the sodium salt of said ribonucleotide from said eluate.

References Cited by the Examiner

UNITED STATES PATENTS

| 2,671,059 | 3/54 | Smit | 260—2.1 |
| 2,902,480 | 9/59 | Hidy et al. | 260—211.5 |

FOREIGN PATENTS 763,608  12/56  Great Britain.

LEWIS GOTTS, *Primary Examiner.*